United States Patent
Jeswani et al.

(10) Patent No.: US 10,982,821 B2
(45) Date of Patent: Apr. 20, 2021

(54) DOWNLIGHT WITH SELECTABLE LUMENS AND CORRELATED COLOR TEMPERATURE

(71) Applicants: Anil Jeswani, Acton, MA (US); Astrid van Breda, Haverhill, MA (US); Ravidasa Hegde, Andover, MA (US); Soumya Kanta Ray, Methuen, MA (US)

(72) Inventors: Anil Jeswani, Acton, MA (US); Astrid van Breda, Haverhill, MA (US); Ravidasa Hegde, Andover, MA (US); Soumya Kanta Ray, Methuen, MA (US)

(73) Assignee: LEDVANCE LLC, Wilmington, MA (US)

(*) Notice: Subject to any disclaimer, the term of this patent is extended or adjusted under 35 U.S.C. 154(b) by 0 days.

(21) Appl. No.: 16/863,207

(22) Filed: Apr. 30, 2020

(65) Prior Publication Data
US 2020/0263840 A1    Aug. 20, 2020

Related U.S. Application Data

(63) Continuation of application No. 15/972,647, filed on May 7, 2017, now Pat. No. 10,683,969.

(51) Int. Cl.
| | | |
|---|---|---|
| *F21K 9/238* | (2016.01) | |
| *F21V 23/04* | (2006.01) | |
| *F21K 9/278* | (2016.01) | |
| *F21S 8/02* | (2006.01) | |
| *F21V 21/03* | (2006.01) | |
| *F21K 9/275* | (2016.01) | |
| *F21K 9/65* | (2016.01) | |
| *H05B 45/37* | (2020.01) | |
| *F21S 4/00* | (2016.01) | |

(52) U.S. Cl.
CPC .............. *F21K 9/238* (2016.08); *F21K 9/275* (2016.08); *F21K 9/278* (2016.08); *F21K 9/65* (2016.08); *F21S 8/026* (2013.01); *F21V 21/03* (2013.01); *F21V 23/04* (2013.01); *H05B 45/37* (2020.01); *F21S 4/00* (2013.01)

(58) Field of Classification Search
CPC .. F21K 9/275; F21K 9/65; F21K 9/278; F21S 8/026; F21V 23/04
See application file for complete search history.

(56) References Cited

U.S. PATENT DOCUMENTS 9,892,693 B1 * 2/2018 Kumar .................... F21S 8/026

* cited by examiner

*Primary Examiner* — Anabel Ton
(74) *Attorney, Agent, or Firm* — Tutunjian & Bitetto PC

(57) ABSTRACT

A lamp is provided that can have at least one interface on the lamp body for a selectable lumens and selectable correlated color temperature (CCT). In one embodiment, the lamp design includes a housing having a downlight geometry and a light engine including at least one string of light emitting diodes (LEDs), in which the light engine is position to emit light through a light emission end of the housing having the downlight geometry. The lamp also includes at least one first switch for selecting at least one lumen setting for the light emitted by the light engine; and at least one second switch for selecting at least one correlated color temperature. The first and second switch are mounted to the housing.

20 Claims, 6 Drawing Sheets

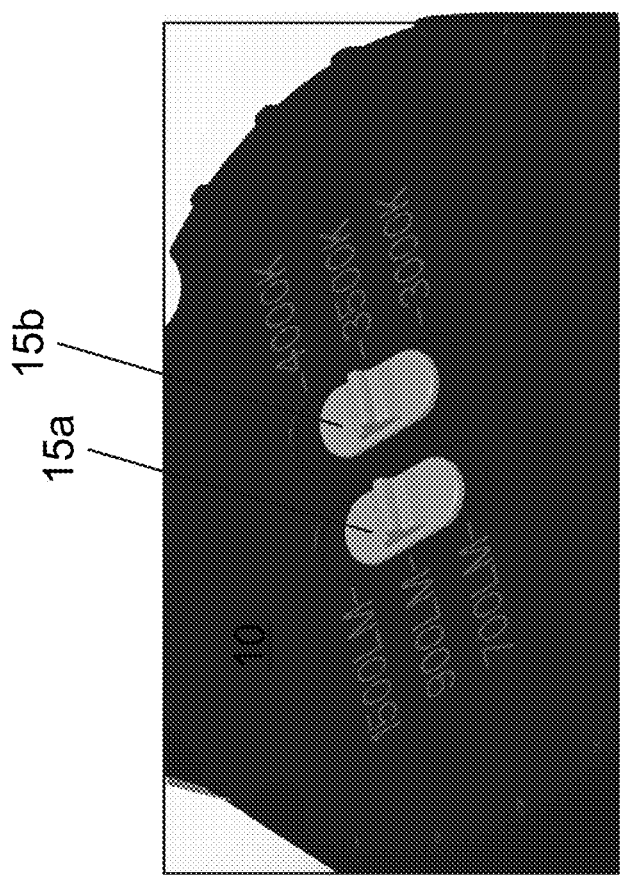
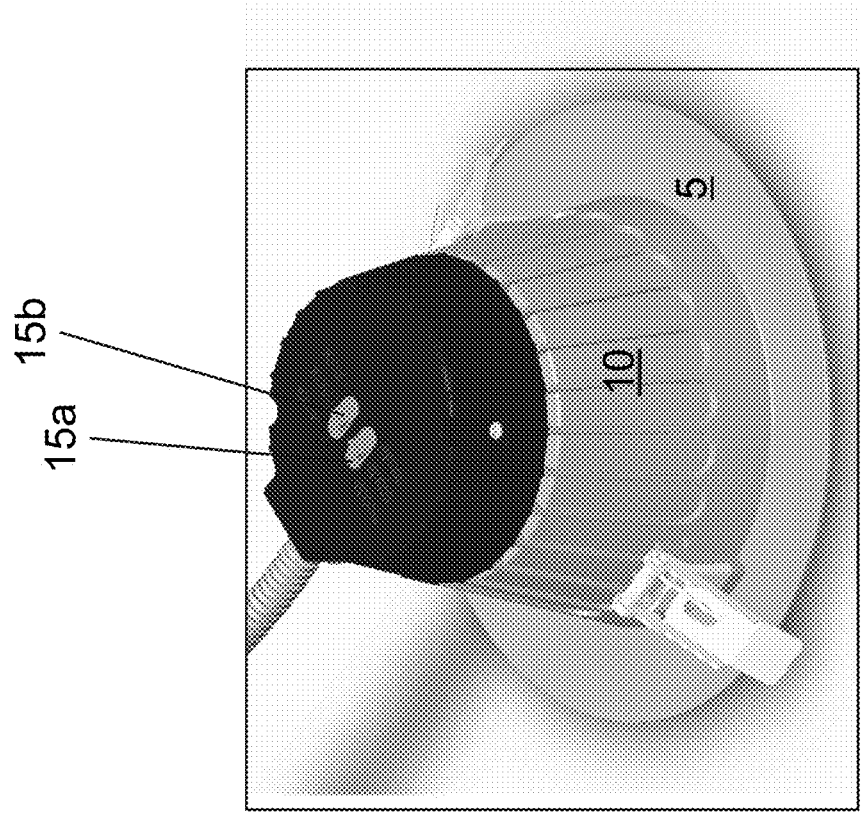
FIG. 1B
FIG. 1A

DOWNLIGHT WITH SELECTABLE LUMENS AND CORRELATED COLOR TEMPERATURE

CROSS-REFERENCE TO RELATED APPLICATION

"This patent application is a Continuation and claims benefit and priority to U.S. patent application Ser. No. 16/288,269, titled "LIGHT EMITTING DIODE FILAMENT LAMP WITH V-GEOMETRY" filed on Feb. 27, 2019, which is herein incorporated by reference in its entirety."

TECHNICAL FIELD

The present disclosure generally relates to lamp assemblies employing light emitting diodes as the light source.

BACKGROUND

One of the most common light fixtures is the recessed can downlight (RCD), which is an open-bottom can that contains a light bulb, most commonly an incandescent bulb or a fluorescent bulb. The fixture is typically connected to the power mains at 120 to 277 volts, 50/60 Hz. RCDs are generally installed during the construction of a building before the ceiling material (such as plaster or gypsum board) is applied. Therefore, they are not easily removed or substantially reconfigured during their lifetime. Recently, lighting devices have been developed that make use of light emitting diodes (LEDs) for a variety of lighting applications. Owing to their long lifetime and high energy efficiency, LED lamps are now also designed for replacing traditional incandescent and fluorescent lamps, i.e., for retrofit applications. For such applications, the LED retrofit lamp is typically adapted to fit into the socket of the respective lamp fixture to be retrofitted.

SUMMARY

In one aspect, a lamp is provided that can have at least one interface on the lamp body for a selectable lumens and selectable correlated color temperature (CCT). In one embodiment, the lamp design includes a housing having a downlight geometry and a light engine including at least one string of light emitting diodes (LEDs), in which the light engine is positioned to emit light through a light emission end of the housing having the downlight geometry. The lamp also includes at least one first switch for selecting at least one lumen setting for the light emitted by the light engine; and at least one second switch for selecting at least one correlated color temperature. The first and second switch are mounted to the housing.

In another embodiment, a lamp is provided that includes a housing having a downlight geometry and a light engine including at least one string of light emitting diodes (LEDs), in which the light engine is positioned to emit light through a light emission end of the housing having the downlight geometry. The lamp also includes at least one first switch for selecting at least one lumen setting for the light emitted by the light engine; and at least one second switch for selecting at least one correlated color temperature. The first and second switch are mounted to the housing. In addition to the light engine being in electrical communication with the first and second switch for selecting settings for correlated color temperature and lumen setting, the light engine may also be in electrical communication with a receiver for receiving setting commands for dimming and intensity of the light being emitted by the lamp.

In another embodiment, a lighting method is provided. The lighting method includes housing a light source including at least one string of light emitting diodes in a body of a lamp having a downlight geometry. The method also includes providing device circuitry that allows for adjustments to lumen settings and correlated color temperature settings through an interface of setting switches fixed to the body of the lamp. The method also includes providing a receiver for receiving from a remote switch adjustments to dimming and intensity settings for light emitted by the lamp.

BRIEF DESCRIPTION OF THE DRAWINGS

The following description will provide details of embodiments with reference to the following figures wherein:

FIG. 1A is a perspective view of lamp design including a housing having a downlight geometry and a light engine including at least one string of light emitting diodes (LEDs), in which the lamp also includes at least one first switch for selecting at least one lumen setting for the light emitted by the light engine, and at least one second switch for selecting at least one correlated color temperature (CCT), in accordance with one embodiment of the present disclosure.

FIG. 1B is a magnified perspective view of the first and second switches for selecting the lumen settings and correlated color temperature (CCT) that is depicted in FIG. 1A, in which the first and second switches are mounted to the housing.

DETAILED DESCRIPTION

Figure 3:
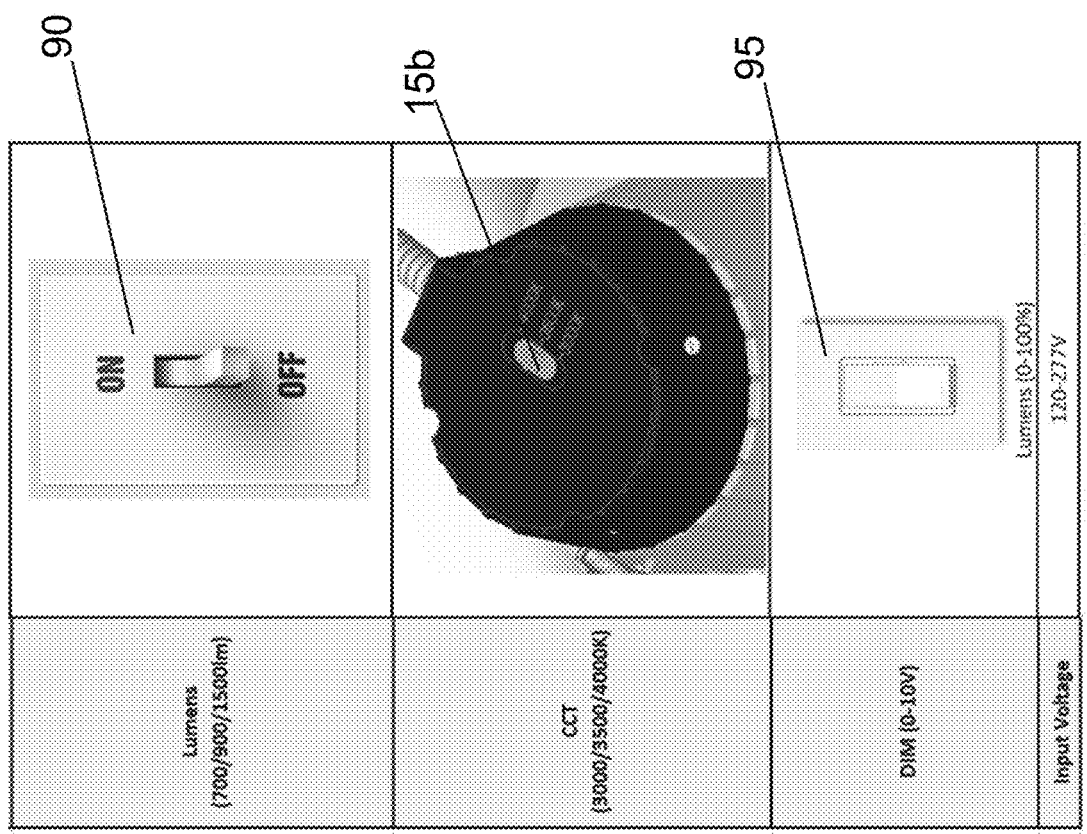
FIG. 3 is a perspective view of lamp design including a housing having a downlight geometry and a light engine including at least one string of light emitting diodes (LEDs), in which the lamp also includes a switch for selecting at least one correlated color temperature (CCT) setting for the light emitted by the light engine fixed to the housing, an "ON"/"OFF" wall switch for selecting at least one lumen setting for light emitted by the lamp, and a remote dimmer switch for adjusting the dimming/intensity of the light emitted by the lamp, in accordance with one embodiment of the present disclosure.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In some embodiments, the present disclosure provides a downlight with selectable lumens settings and selectable correlated color temperature (CCT) settings, in which the settings can be selected by switches that are fixed to the body of the downlight. The methods and structures described herein can provide different light output (lumen) levels and different light color levels (CCTs) in a single downlight. In some embodiments, via selectable switch, a lighting designer can adapt the downlight to an application space by selecting appropriate light and color levels. The switch gear for selecting the light levels and/or the light color levels can be either provided on the downlight as selectable switches, or can be provided by a combination of selectable switches on the light housing and a remote wall ON/OFF switch. In some embodiments, the downlights that are described herein provide selectable/switchable light level and light color settings in a single downlight for both new construction and retrofit applications. In some examples, the downlight structures having selectable/switchable light level and light color settings that can include switchgear fixed to the housing (also referred to as body) of the downlight structures offers good flexibility to a lighting designer or specifier for selecting either different light output levels (three light output levels of 700/900/1500 lumens) or the light colors (CCTs of 3000K/3500K/4000K). In some embodiments, the selector switches for selecting the different types of light output level, e.g., lumen levels, and/or different types of light color, e.g., correlated color temperature (CCT) settings, are device mounted on a single unit. The light designs of the present disclosure are suitable for 120-277V applications and can be 0-10V dimmable.

Prior to the lighting structures and methods of the present disclosure, if a lighting designer/user wanted different light levels and/or wanted to use different light color (CCT) the user had to remove the already installed unit and replace it with another unit with desired unit with appropriate light output and/or the light color (CCT). This increased the cost of the installation, i.e., both the system and labor costs.

By employing the methods and structures of the present disclosure, including the downlight having device mounted selector switches for selecting the different types of light output level, e.g., lumen levels, and/or different types of light color, e.g., correlated color temperature (CCT) settings, are on a single unit, a lighting designers can now consider having different light levels in combination with different light colors (CCT) which offers more flexibility without incurring the costs of prior downlights not having selectable light settings. The lamp structures of the present disclosure are now described with greater detail with reference to FIGS. 1A-6.

FIGS. 1A, 1B, 4A and 4B depict one embodiment of a downlight 100 including a light engine having a plurality of solid state light emitters, e.g., light emitting diodes (LEDs) 50. A "downlight", or recessed light, (also pot light in Canadian English, sometimes can light (for canister light) in American English) is a light fixture that is installed into a hollow opening in a ceiling. When installed it appears to have light shining from a hole in the ceiling, concentrating the light in a downward direction as a broad floodlight or narrow spotlight. "Pot light" or "canister light" implies the hole is circular and the lighting fixture is cylindrical, like a pot or canister. Broadly, there are three parts to a downlight fixture: 1) housing, 2) trim and 3) light engine. It is noted that this is not an exclusive list of the elements of a downlight fixture. The trim 5 is the visible portion of the downlight. The trim 5 is the insert that is seen when looking up into the fixture, and also includes the thin lining around the edge of the light. The housing 10 is the fixture itself that is installed inside the ceiling and contains the lamp holder. It is noted that embodiments are contemplated in which the trim 5 and the housing 10 are integrated together in one piece, and there are embodiments in which the trim 5 and the housing 10 are separate components. There are many different types of light engines 60 that can be inserted into recessed lighting fixtures, i.e., downlights 100. In accordance with the embodiments of the present disclosure, the light engines 60 applicable to the methods and structures described herein include solid state emitters, such as light emitting diodes (LEDs) 50.

The housing 10 may be composed of a metal, such as aluminum (Al), which provides for heat dissipation of any heat produced by the light engine 15. In some embodiments, to provide for increased heat dissipation, a plurality of ridges or fin structures may be integrated into the aluminum housing 10. In some embodiments, the housing 10 may also be composed of a plastic, such a polycarbonate. The construction of the housing 10 may fall into one of four categories for downlights that are recognized in North America. For example, the housing may be constructed for IC or "insulation contact" rated new construction housings are attached to the ceiling supports before the ceiling surface is installed. If the area above the ceiling is accessible these fixtures may also be installed from within the attic space. IC housings are typically required wherever insulation will be in direct contact with the housing. Non-IC rated new construction housings are used in the same situations as the IC rated new construction housings, only they require that there be no contact with insulation and at least 3 in (7.6 cm) spacing from insulation. These housings are typically rated up to 150 watts. IC rated remodel housings are used in existing ceilings where insulation will be present and in contact with the fixture. Non-IC rated remodel housings are used for existing ceilings where, no insulation is present. Non-IC rated remodel housings require that there be no contact with insulation and at least 3 in (7.6 cm) spacing from insulation. Sloped-ceiling housings are available for both insulated and non-insulated ceilings that are vaulted. It is noted that the housing 10 of the downlight of the present disclosure may be designed to meet the requirements of any of the aforementioned standards. The housing 10 is typically designed to ensure that no flammable materials come into contact with the hot lighting fixture.

The housing 10 may be dimensioned to be available in various sizes based on the diameter of the circular opening where the downlight 100 is installed. In some examples, the circular opening of the housing 10 may be sized in 4, 5 and 6 inch diameter. It is noted that these dimensions are provided for illustrative purposes only and are not intended to limit the present disclosure. For example, the housing 10 may also have a circular opening in diameters equal to 2 inches or 3 inches. The opening of the housing may also be multi-sided, such as square or rectangular.

In some embodiments, the housing 10 can also be "Air Tight", which means it will not allow air to escape into the ceiling or attic, thus reducing both heating and cooling costs.

The trim 5 of the downlight 100 is selected to increase the aesthetic appearance of the lamp. In some embodiments, the trim 5 may be a baffle that is black or white in color. In some embodiments, the trim 5 is made to absorb extra light and create a crisp architectural appearance. There are cone trims which produce a low-brightness aperture. In some embodiment, the trim 5 may be a multiplier that is designed to control the omnidirectional light from the light engine. Lens trim is designed to provide a diffused light and protect the lamp. Lensed trims are normally found in wet locations. The luminous trims combine the diffused quality of lensed trim but with an open down light component. Adjustable trim allows for the adjustment of the light whether it is eyeball style, which protrudes from the trim or gimbal ring style, which adjusts inside the recess.

The light engine (also referred to as light source) is positioned within the housing 10 and orientated to emit light in a direction through opening of the housing 10 at which the trim 5 is positioned. The light engine produces light from solid state emitters.

The term "solid state" refers to light emitted by solid-state electroluminescence, as opposed to incandescent bulbs (which use thermal radiation) or fluorescent tubes, which use a low pressure Hg discharge. Compared to incandescent lighting, solid state lighting creates visible light with reduced heat generation and less energy dissipation. Some examples of solid state light emitters that are suitable for the methods and structures described herein include inorganic semiconductor light-emitting diodes (LEDs), organic light-emitting diodes (OLED), polymer light-emitting diodes (PLED) or combinations thereof. Although the following description describes an embodiment in which the solid state light emitters are provided by light emitting diodes, any of the aforementioned solid state light emitters may be substituted for the LEDs. FIGS. 5A and 5B illustrate one example of the light emitting diodes (LEDs) 50 of a light engine 60 that can be utilized within the downlights 100 that are depicted in FIGS. 1A-4B.

Referring to FIGS. 5A and 5B, in some embodiments, the light source (also referred to as light engine) for the downlight 100 is provided by plurality of LEDs 50 that can be mounted to the circuit board 60 by solder, a snap-fit connection, or other engagement mechanisms. In some examples, the LEDs 50 are provided by a plurality of surface mount device (SMD) light emitting diodes (LED).

The circuit board 70 for the light engine 60 may be composed of a metal core printed circuit board (MCPB). MCPCB uses a thermally conductive dielectric layer to bond circuit layer with base metal (Aluminum or Copper). In some embodiments, the MCPCB use either Al or Cu or a mixture of special alloys as the base material to conduct heat away efficiently from the LEDs thereby keeping them cool to maintain high efficacy. In some other embodiments, the PCB type may be FR4 or CEMI.

It is noted that the number of LEDs 50 on the printed circuit board 70 may vary. For example, the number of LEDs 50 may range from 5 LEDs to 70 LEDs. In another example, the number of LEDs 50 may range from 35 LEDs to 45 LEDs. It is noted that the above examples are provided for illustrative purposes only and are not intended to limit the present disclosure, as any number of LEDs 50 may be present the printed circuit board 70. In some other examples, the number of LEDs 50 may be equal to 5, 10, 15, 20, 25, 30, 35, 40, 45, 50, 55, 60, 65 and 70, as well as any range of LEDs 50 with one of the aforementioned examples as a lower limit to the range, and one of the aforementioned examples as an upper limit to the range.

The LEDs 50 may be arranged as strings on the printed circuit board 70. When referring to a "string" of LEDs it is meant that each of the LEDs in the string are illuminated at the same time in response to an energizing act, such as the application of electricity from the driving electronics, e.g., driver, in the downlight 100. The LEDs 50 in a string of LEDs are electrically connected for this purpose. For example, when the a string of LEDs 50 is energized for illumination, all of the LEDs in the string are illuminated. Further, in some embodiments, illuminating the first string of LEDs 50 does not illuminate the LEDs in the second string of LEDs 50, and vice versa, as they are independently energized by the driving electronics, and not electrically connected. It is also noted that the same LED may be shared by more than one string.

In one example, a first string of LEDs 50 may be illuminated to provide an intensity of light emitted by the light engine 60 for the downlight 100 that is on the order of 500 lumens (LM), a second string of LEDs 50 may be illuminated to provide an intensity of light emitted by the light engine 60 for the downlight 100 that is on the order of 900 lumens (LM); and a third string of LEDs 50 may be illuminated to provide an intensity of light emitted by the light engine 60 for the downlight 100 that is on the order of 1500 lumens (LM).

In another example, a fourth string of LEDs 50 may be illuminated to provide an correlated color temperature (CCT) of light emitted by the light engine 60 for the downlight 100 that is on the order of 2700K, a fifth string of LEDs 50 may be illuminated to provide an correlated color temperature (CCT) of light emitted by the light engine 60 for the downlight 100 that is on the order of 3500K; and a sixth string of LEDs 50 may be illuminated to provide an intensity of light emitted by the light engine 60 for the downlight 100 that is on the order of 4000K.

It is noted that the above examples of LED strings are consistent with the selectable settings for light emitted by the downlight 100 that are depicted in FIGS. 1A and 1B. The present disclosure is not limited to only this example, as other lighting characteristics can be assigned to strings of LEDs that can be selected by a user through the interfaces with the downlight 100 that are described herein.

In some embodiments, the LEDs 50 of the lamp 100 are selected to be capable of being adjusted for the color of the light they emit. The term "color" denotes a phenomenon of light or visual perception that can enable one to differentiate objects. Color may describe an aspect of the appearance of objects and light sources in terms of hue, brightness, and saturation. Some examples of colors that may be suitable for use with the method of controlling lighting in accordance with the methods, structures and computer program products described herein can include red (R), orange (O), yellow (Y), green (G), blue (B), indigo (I), violet (V) and combinations thereof, as well as the numerous shades of the aforementioned families of colors. It is noted that the aforementioned colors are provided for illustrative purposes only and are not intended to limit the present disclosure as any distinguishable color may be suitable for the methods, systems and computer program products described herein.

The LEDs 50 of the lamp 100 may also be selected to allow for adjusting the "color temperature" of the light they emit. The color temperature of a light source is the temperature of an ideal black-body radiator that radiates light of a color comparable to that of the light source. Color temperature is a characteristic of visible light that has applications in lighting, photography, videography, publishing, manufacturing, astrophysics, horticulture, and other fields. Color temperature is meaningful for light sources that do in fact correspond somewhat closely to the radiation of some black body, i.e., those on a line from reddish/orange via yellow and more or less white to blueish white. Color temperature is conventionally expressed in kelvins, using the symbol K, a unit of measure for absolute temperature. Color temperatures over 5000 K are called "cool colors" (bluish white), while lower color temperatures (2700-3000 K) are called "warm colors" (yellowish white through red). "Warm" in this context is an analogy to radiated heat flux of traditional incandescent lighting rather than temperature. The spectral peak of warm-colored light is closer to infrared, and most natural warm-colored light sources emit significant infrared radiation. The LEDs 50 of the lamps provided by the present disclosure in some embodiments can be adjusted from 2000K to 7000K.

The LEDs 50 of the lamp 100 may also be selected to be capable of adjusting the light intensity/dimming of the light they emit. In some examples, dimming or light intensity may be measured using lumen (LM). In some embodiments, the dimming or light intensity adjustment of the LEDs 50 can provide for adjusting lighting between 100 LM to 2000 LM. In another embodiment, dimming or light intensity adjustment of the LEDs 50 can provide for adjusting lighting between 500 LM to 1750 LM. In yet another embodiment, the dimming or light intensity adjustment of the LEDs 50 can provide for adjusting lighting between 700 LM to 1500 LM.

In some embodiments, the LED light engines 60 for the downlight may provide the that downlight be an SMD (Surface Mount Diode) downlight and/or a COB (Chip on Board) downlights. In some embodiments, the LEDs 50 may be selected to be SMD type emitters, in which the SMDs are more efficient than COBs because the light source produces higher lumens per watt, which means that they produce more light with a lower wattage. In some embodiments, the SMD type LEDs 50 can produce a wider beam of light which is spread over a greater area when compared to light engines of COB type LEDs. This means that less material is needed for the heat sink, which in turn means that they are more economical. SMD downlights can be covered with a frosted reflector which hides the LED chip array, and spreads the light evenly. SMD downlights can produce a wide spread of light. In some example, the wide beam angle of the light emitted from SMD downlights means they can be suitable for larger rooms like living rooms, bedrooms, kitchens and bathrooms.

A Chip On Board (COB) LED Downlight consists of a single LED chip, mounted on the downlight, compared to an array of LED's like an SMD. COB LEDs are basically multiple LED chips (typically nine or more) bonded directly to a substrate by the manufacturer to form a single module. The ceramic/aluminum substrate of COB LEDs also acts as a higher efficiency heat transfer medium when coupled to an external heatsink, further lowering the overall operating temperature of the assembly. Since the individual LEDs used in a COB are chips, the chips can be mounted such that they take up less space and the highest potential of the LED chips can be obtained. When the COB LED package is energized, it appears more like a lighting panel than multiple individual lights as would be the case when using several SMD LEDs mounted closely together. In some embodiments, because the single cluster of LED's 50 are mounted in one point, they can require greater cooling, so a heat sink, usually made of aluminum, may be mounted to dissipate the heat.

A light engine of COB type LEDs 50 can provide a more focused light and with the use of reflectors, the light beam can be more controlled when compared to a light engine that is composed of SMD LEDs. Chrome reflectors surrounding the diode can be replaced and set at different angles to make the light beam narrower or wider. Due to the narrow beam and with the use of reflectors that are usually clear, COB lights generate crisper and cleaner as there is no frosting on the lenses, which cuts down the clarity of the LED light. Due to the clear lenses, more light can penetrate further which means they perform well in rooms with high ceilings.

It is noted that the above description of the light emitting diodes (LEDs) 50 is provided for illustrative purposes only, and is not intended to limit the present disclosure. For example, In some embodiments, other light sources may either be substituted for the LEDs 50, or used in combination with the LEDs 50, such as organic light-emitting diodes (OLEDs), a polymer light-emitting diode (PLED), and/or a combination of any one or more thereof.

Referring to FIGS. 1A and 1B, in some embodiments, the downlight 100 includes at least one interface on the lamp housing 100 for selecting a lumen setting and for selecting a correlated color temperature (CCT) setting for the light being emitted by the light engine 60 of the downlight 100. In some embodiments, the switch 15a, 15b for selecting each of the settings may be a toggle switch, a pushbutton switch, and/or a selector switch. Toggle switches are actuated by a lever angled in one of two or more positions. Pushbutton switches are two-position devices actuated with a button that is pressed and released. Selector switches are actuated with a rotary knob or lever of some sort to select one of two or more positions. Like the toggle switch, selector switches can either rest in any of their positions or contain spring-return mechanisms for momentary operation. It is noted that the above examples are provided for illustrative purposes only, and are not intended to limit the types of switches that are to be used in accordance with the present disclosure. Any switch used to interrupt the flow of electrons in a circuit can be suitable for use as a switch 15a, 15b for selecting settings for the lumen output of the light emitted by the downlight and/or selecting the correlated color temperature (CCT) of the light emitted by the downlight 100. In one example, a simplest type of switch is one where two electrical conductors are brought in contact with each other by the motion of an actuating mechanism.

Referring to FIGS. 1A and 1B, in one embodiment, the downlight includes a first switch 15a for selecting at least one lumen setting for the light emitted by the light engine 60; and a second switch 15b for selecting at least one correlated color temperature (CCT). In the embodiment that is depicted in FIGS. 1A and 1B, the first switch 15a may be positioned to select a lumen setting from three possible settings, e.g., a first lumen setting of 700LM, a second lumen setting of 900LM, and a third lumen setting 1500LM. In the embodiment that is depicted in FIGS. 1A and 1B, the second switch 15b may be positioned to select a correlated color temperature (CCT) setting from three possible settings, e.g., a first correlated color temperature (CCT) setting of 2700K, a second correlated color temperature (CCT) setting of 3500K, and a third correlated color temperature (CCT) setting 4000K. In the example, that is depicted in FIGS. 1A and 1B, the single downlight offers 9 unique combinations of light levels and color temperature settings.

It is noted that the number of selectable settings provided by the first and second switches 15a, 15b depicted in FIGS. 1A and 1B is provided for illustrative purposes only and is not intended to limit the present disclosure. For example, the number of selectable settings that may be selected using the first and second switches 15a, 15b may be equal to 2, 3, 4, 5, 6, 7, 8, 9 and 10, as well as any range for the number of selectable settings including a lower limit provided by one of the aforementioned examples, and an upper limit provided by one of the aforementioned examples. Further, the values for the selectable settings, e.g., lumen settings and correlated color temperature (CCT) settings, are not limited to those described above and depicted in FIGS. 1A and 1B.

For example, the first switch 15a may select at least one lumen setting, e.g., a set of three lumen settings, selected from 500LM, 600 LM, 700LM, 800LM, 900LM, 1000LM, 1100LM, 1200LM, 1300LM, 1400LM, 1500LM, 1600LM, 1700LM, 1800LM, 1900LM and 2000LM, as well as any range for the lumens associated with the light emitted by the downlight including a lower limit provided by one of the aforementioned examples, and an upper limit provided by one of the aforementioned examples.

For example, the second switch 15b may select at least one correlated color temperature (CCT) setting selected from 2500K, 2600K, 2700K, 2800K, 2900K, 3000K, 3100K, 3200K, 3300K, 3400K, 3500K, 3600K, 3700K, 3800K, 3900K, 4000K, 4100k, 4200K, 4300K, 4400K and 4500K, as well as any range for the correlated color temperature (CCT) associated with the light emitted by the downlight including a lower limit provided by one of the aforementioned examples, and an upper limit provided by one of the aforementioned examples.

The first and second switch 15a 15b are mounted to the housing 10. For example, the first and second switch 15a, 15b may be mounted to the backside surface of the housing 10, which is opposite the face of the housing 10 that the trim 5, in which the trim 5 is present about an opening through which the light emitted from the light engine 60 is directed. The backside surface of the housing 10 is positioned within the ceiling when the downlight 100 is installed. It is not necessary for every embodiment that the first and second switches 15a, 15b be mounted to the back surface of the housing 10. In some embodiments, at least one of the first and second switches 15a, 15b may be mounted on the sidewall of the housing 10, which is the portion of the housing between the back surface of the housing 10, and the portion of the housing that the trim 5 is mounted to. In other embodiments, at least one of the first and second switches 15a, a5b may be mounted to the trim 5.

In addition to the light engine being in electrical communication with the first and second switch for selecting settings for correlated color temperature and lumen setting, the light engine may also be in electrical communication with a receiver for receiving setting commands for dimming and intensity of the light being emitted by the lamp. In some embodiments, the dimming function may be controlled through a 0-10V dimming wall switch. The 0-10V dimming wall switch is remotely mounted from the housing 10 of the downlight 100. The 0-10V dimming wall switch communicates with a 0-10V dimming circuit 71 in the electronics package 200 of the downlight 100.

Figure 6:
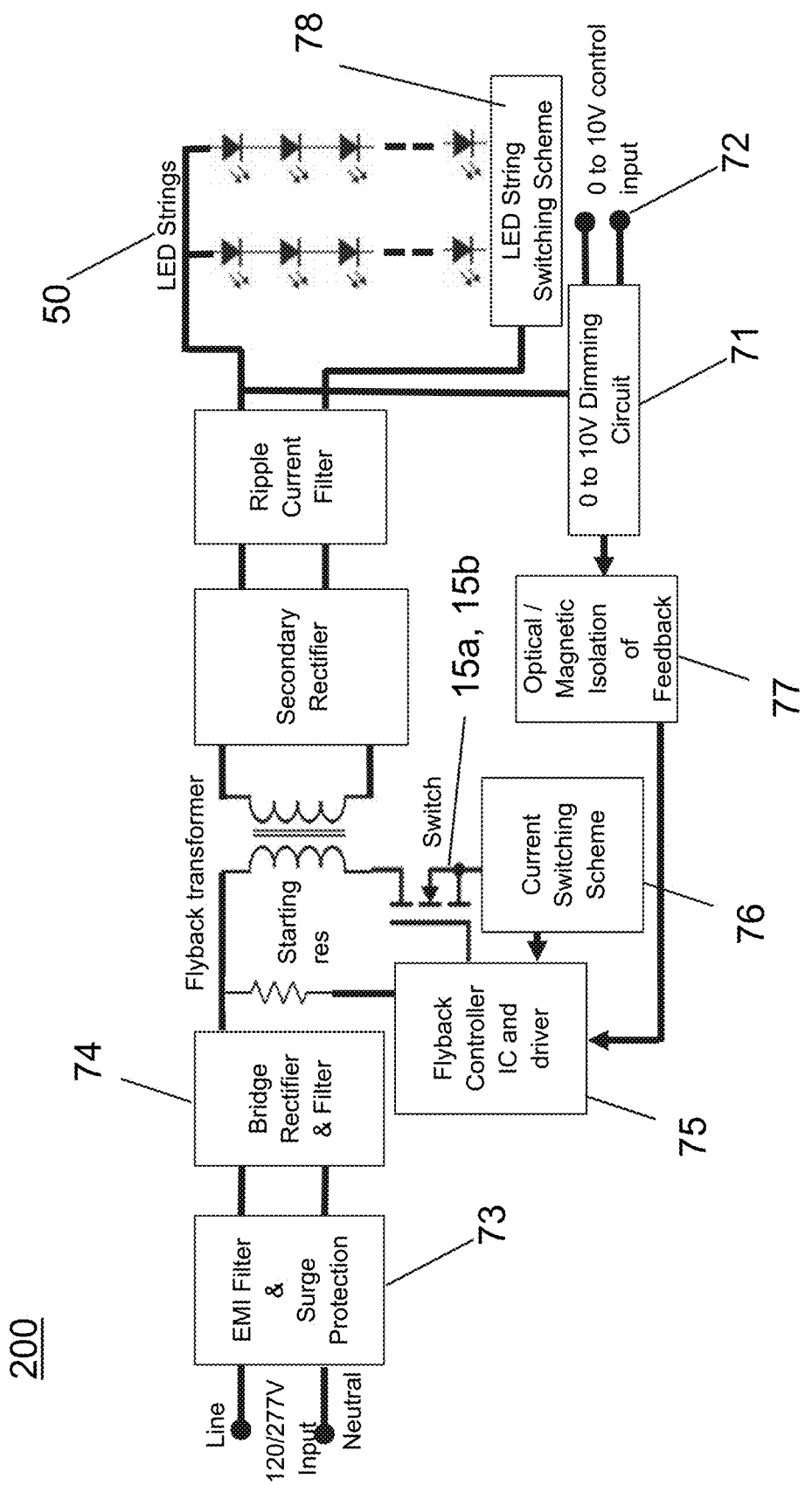
FIG. 6 is a circuit diagram for the electronics package of one embodiment of the lamp designs that is depicted in FIGS. 1A-4B.

Referring to FIG. 6, the 0-10V dimming circuit 71 is in electric communication with a 0-10V dimming input 72 that receives the signal from the 0-10V dimming wall switch. The 0-10V dimming circuit 71 is in electrical communication with the LEDs 50, i.e., strings of LEDs 50 of the light engine 60. The 0-10V dimming circuit 71 may be referred to as a 0-10 dimmable LED driver.

In lighting control applications, "0-10" describes the use of an analog controller to adjust the voltage in a 2-wire (+10 VDC and Common) bus connecting the controller to one or more LED drivers equipped with a 0-10 VDC dimming input. A 0-10V dimmable LED driver includes a power supply circuit that produces approximately 10 VDC for the signal wires and sources an amount of current in order to maintain that voltage. The controlled lighting should scale its output so that at 10 V, the controlled light should be at 100% of its potential output, and at 0 V it should at the lowest possible dimming level.

A 0-10V LED dimmable driver designs with a control chip. The 0-10V voltage changes, the power supply output current will change. For example, when the 0-10V dimming signal modulates to 0V, the output current will be 0, the brightness of the light will be off; when the 0-10V dimming modulates to maximum 10V, the output current will reach 100% power output, the brightness will be 100%.

Figure 4B:
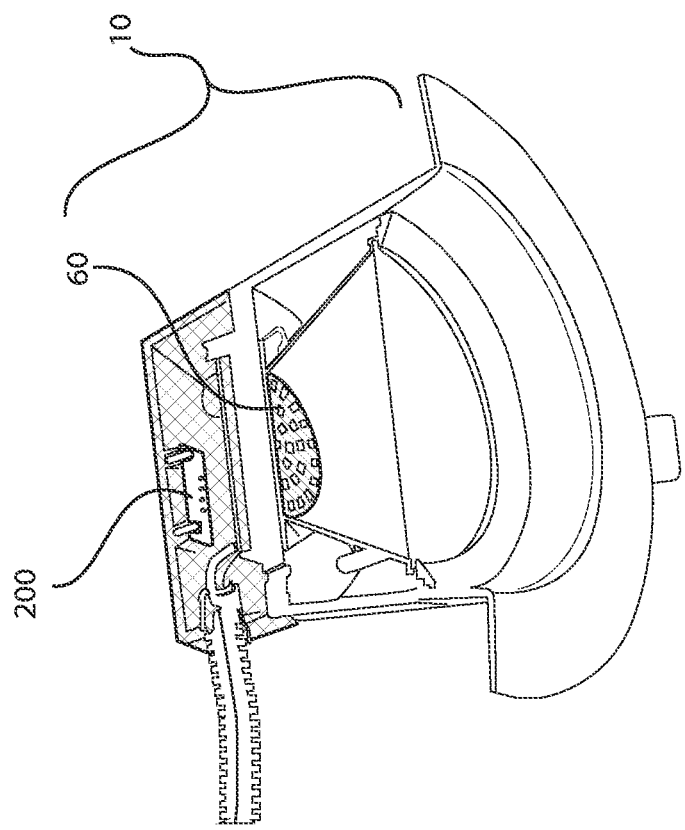
FIG. 4B is a cross-sectional view of the lamp design depicted in FIG. 4A.
Figure 4A:
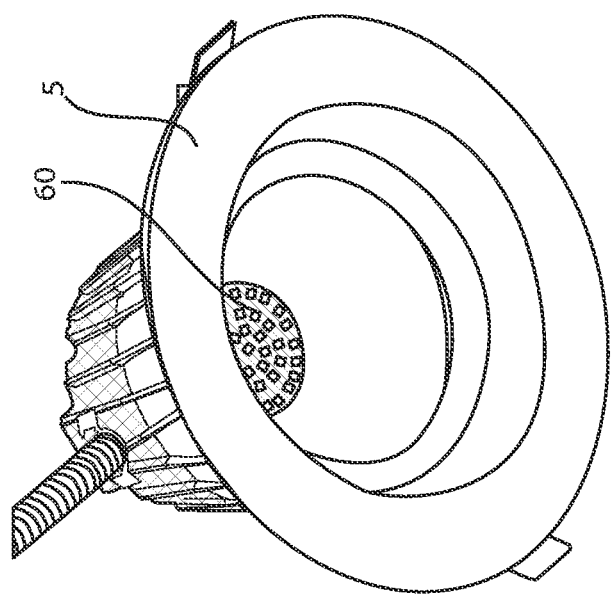
FIG. 4A is a perspective view of a downlight geometry lamp that has been tilted to depict the light engine including at least one string of light emitting diodes, in which the lamp design includes at least one first switch for selecting at least one lumen setting for the light emitted by the light engine, and at least one second switch for selecting at least one correlated color temperature (CCT), in accordance with one embodiment of the present disclosure.
Figure 5B:
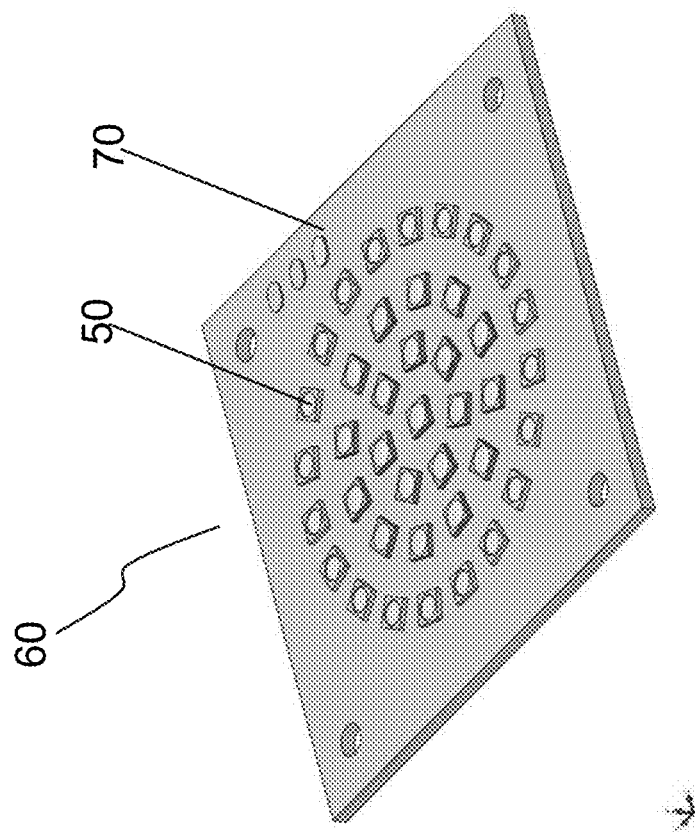
FIG. 5B is a perspective view of the light engine depicted in FIG. 5A.
Figure 5A:
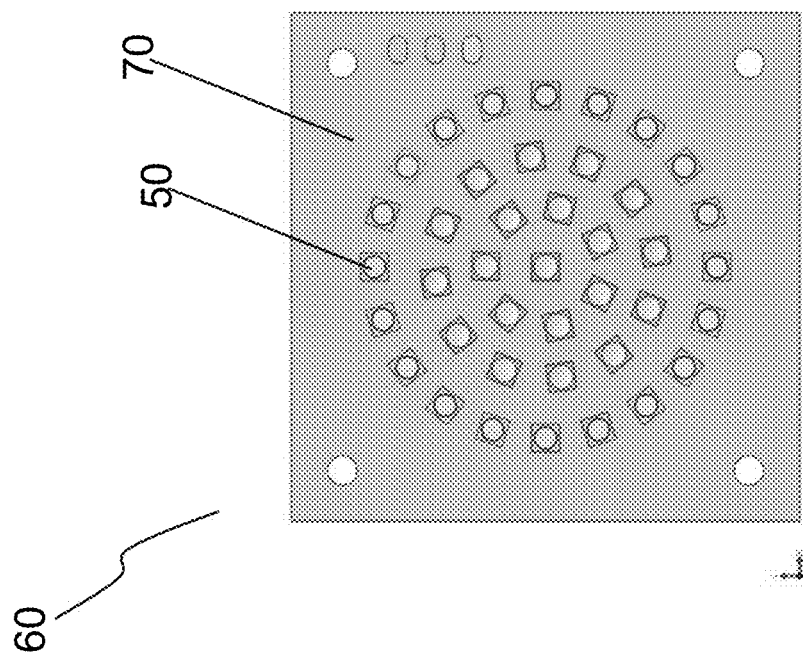
FIG. 5A is a top down view of a light engine including at least one string of light emitting diodes (LEDs) as used in the lamp designs depicted in FIGS. 1A-4B.

The electronics package 200 including the receiver, i.e., input 72, for the 0-10V wall switch may be mounted within the house 10, as depicted in FIG. 4B. In some embodiments, although not depicted in the supplied figures, at least some components of the electronics package 200 may be positioned outside the housing 10 in a remote electronics package.

Referring to FIG. 6, in some embodiments the electronics package 200 for the downlight 100 may further include: EMI filter and surge protection 73, bridge rectifier and filter 74, flyback converter 75, current switching scheme 76, optical/magnetic isolation of the feedback 77, LED strings, 60 and LED string switching scheme 78.

The EMI filter and surge protection 73 portion of the electronics package 200 includes an EMI filter to filter the high frequency noise generated by the flyback converter from entering the mains input terminals of line and neutral. The surge protector protects the lamp from the surge caused by events such as lightning and disturbances on the mains grid. The Surge protector absorbs the energy and limits the peak voltage to a safe level.

The bridge rectifier and filter 74 portion of the electronics package 200 includes a bridge rectifier that rectifies the AC input voltage into a pulsating DC voltage. The filter filters the high frequency noise.

The flyback converter 75 portion of the electronics package 200 contains the flyback transformer, switch, flyback controller, starting resistor, secondary rectifier and ripple current filter. This section of the electronics package 200 generates the required voltage and current as per the need of the LED strings 50. This section also provides the necessary isolation between the input and output.

The current switching scheme 76 portion of the electronics package 200 includes the switch 15a that the user can control the lumen output of the downlight 200. In some embodiments, this is done by changing the output current of the power supply going into the LEDs. The current switching circuit consists of a network and combination of different values of current sense resistors. Depending on the switch position specific part of the circuit is activated and the sense resistors in that branch circuit determines the current flowing into the power supply output and hence the LEDs 50. The switching scheme 76 changes the feedback signal into the controller IC 75 based on the position of the switch 15a. The IC will control the current based on that feedback signal.

The optical/magnetic isolation circuit 77 portion of the electronics package 200 provides electrical isolation of the control signal from the 0 to 10V dimming circuit 71 going into the flyback controller IC. In some instances, this isolation can provide for the safety of the user when installing or operating the 0 to 10V dimmer.

The 0 to 10V dimming circuit 71 of the electronics package 200 accepts the input from the 0 to 10V dimmer and generates corresponding signal for the flyback controller IC. This enables the change of output current from power supply going into LEDs to be controlled by the external 0 to 10V dimmer.

The LED string 50 portion of the electronics package 200 includes the circuitry to the number of LEDs, and the number of LED strings. The LED type, e.g., color temperature, can be chosen based on the requirement for the light output characteristics. These LED strings are driven by the voltage and current generated by the flyback converter and they generate the required optical characteristics.

LED string switching scheme 78 portion of the electronics package 200 is a circuit determines which string, i.e., string of LEDs 50, is operating based on the users' selection of the switch position 15a, 15b. Accordingly, it may operate just one string of LEDs 50, or more than one string of LEDs 50 based on the correlated color temperature (CCT) setting of the switch 15b. In the example provided in FIGS. 1A and 1B, in which the switch 15b for selecting the correlated color temperature (CCT) of the downlight 100 has three selectable positions, i.e., three positions for color correlated temperature (CCT) values that are equal to 2700K, 3500K and 4000K. In some examples, each setting that can be selected by the switch 15b may energize a different LED string of LEDs 50 for each of the three different color correlated temperature (CCT) values. In another embodiment, the lamp interface, i.e., switch 15b, may offer three light color options (CCTs of 2700K/3500K/4000K), but the design of the light engine 60 may only include two strings of LEDs, e.g., only a first string of LEDs 50 having a correlated color temperature (CCT) of 2700K and second string of LEDs 50 having a correlated color temperature (CCT) of 4000K. In this example, when a user selects the 3500K setting from the switch 15b, this light color is achieved by mixing light from both the 2700K and 4000K LEDs, which is achieved by the LED string switching scheme.

In one example, to achieve light levels 700LM, 900LM and 1500LM, as well selectable correlated color temperature (CCT) levels of 3000k, 3500k, and 4000K, the following LED type and circuit can be employed: 1) the LED type may be lumileds 6V (forward voltage of LEDs) & 1 W LEDs, and 20 LEDs of CCT 3000K in 2 parallel strings of 10 LEDs in series, and 20 LEDs of CCT 4000K in 2 parallel strings of 10 LEDs in series to provide a total quantity of 40 LEDs.

Figure 2:
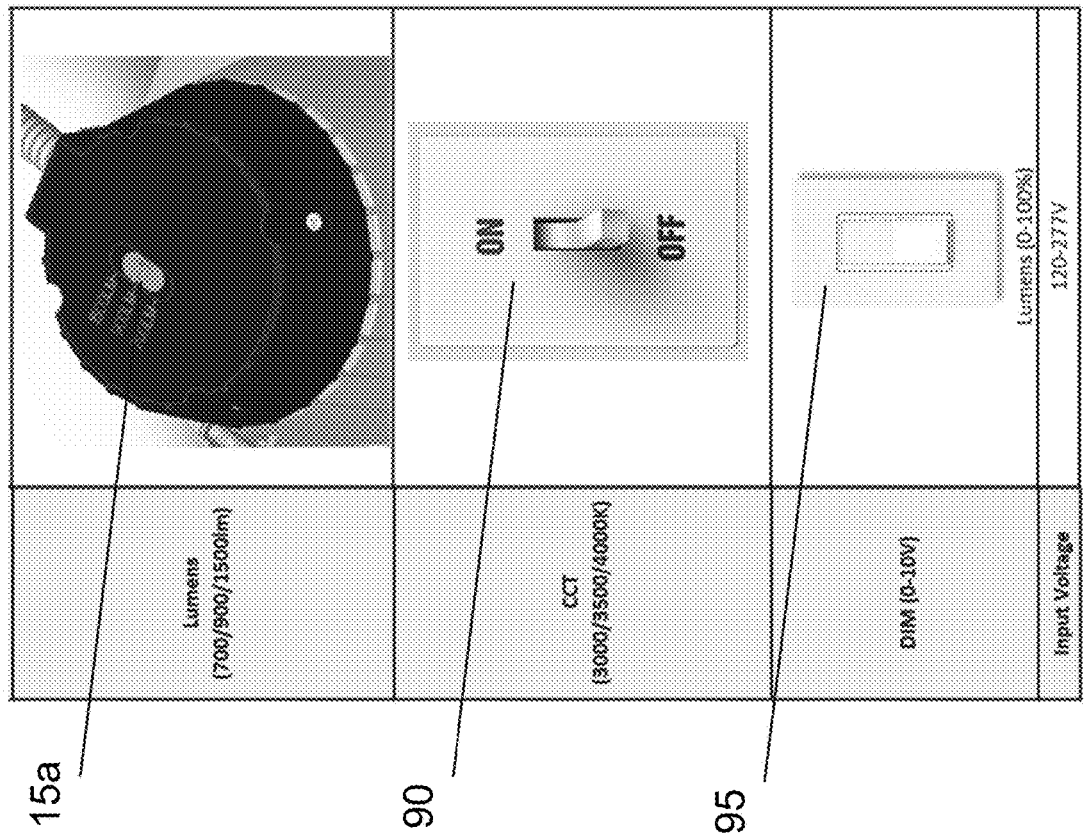
FIG. 2 is a perspective view of lamp design including a housing having a downlight geometry and a light engine including at least one string of light emitting diodes (LEDs), in which the lamp also includes a switch for selecting at least one lumen setting for the light emitted by the light engine fixed to the housing, an "ON"/"OFF" wall switch for selecting at least one correlated color temperature (CCT), and a remote dimmer switch for adjusting the dimming/intensity of the light emitted by the lamp, in accordance with one embodiment of the present disclosure.

The downlight design depicted in FIGS. 1A, 1B, 4A and 4B is only one embodiment of the present disclosure, and it is not intended that the present disclosure be limited to only this example. For example, in addition to switches being fixed to the housing 10 of the downlight for selecting lighting characteristics, embodiments of the present disclosure combine this capability with lighting controls through toggling of a remote "ON/OFF" switch, FIG. 2 depicts one embodiment of a lamp design including a housing 10 having a downlight geometry and a light engine 60 including at least one string of light emitting diodes (LEDs), in which the lamp also includes a switch 15a for selecting at least one lumen setting for the light emitted by the light engine 60 fixed to the housing, an "ON"/"OFF" wall switch 90 for selecting at least one correlated color temperature (CCT), and a remote dimmer switch 95, i.e., 0-10V dimmer wall switch, for adjusting the dimming/intensity of the light emitted by the lamp. The housing 10, the light engine 60 (including the LEDs 50), the switch 15a and the remote dimmer switch 95 have all been described above for the embodiments described with reference to FIGS. 1A, 1B and 4A-6. The description of those elements with reference to FIGS. 1A, 1B and 4A-6 can provide at least one embodiment of these elements for the same structures in FIG. 2. For example, the light levels emitted by the downlight 100, i.e., lumen values, can be adjusted via the switch 15a on the back of the unit. In one example, the selectable lumen levels of light may be equal to 700LM, 900LM and 1500LM.

In the embodiment that is depicted in FIG. 2, the correlated color temperature (CCT) of the light being emitted by the downlight may be selecting through a wall ON/OFF switch. In one example, when the light engine 60 is configured to provide for three selectable correlated color temperatures (CCTs), which can include 2700K, 3500K, and 4000K, the light color (CCT) is switched between the three options by flipping the wall ON/OFF switch until the desired CCT is selected.

FIG. 3 depicts one embodiment of a lamp design including a housing 10 having a downlight geometry and a light engine 60 including at least one string of light emitting diodes (LEDs), in which the lamp also includes a switch 15b for selecting at least one correlated color temperature (CCT) setting for the light emitted by the light engine fixed to the housing, an "ON"/"OFF" wall switch for selecting at least one lumen setting for light emitted by the lamp, and a remote dimmer switch for adjusting the dimming/intensity of the light emitted by the lamp.

The housing 10, the light engine 60 (including the LEDs 50), the switch 15b and the remote dimmer switch 95 have all been described above for the embodiments described with reference to FIGS. 1A, 1B and 4A-6. The description of those elements with reference to FIGS. 1A, 1B and 4A-6 can provide at least one embodiment of these elements for the same structures in FIG. 2. For example, the correlated color temperature (CCT) values for the light emitted by the downlight 100 can be adjusted via the switch 15b on the back of the unit. In one example, the selectable correlated color temperature (CCT) values of light may be equal to 2700K, 3500K and 4000K.

To provide for switching between light modes, i.e., different settings for light lumens and correlated color temperature of light, being emitted by the downlight using an ON/OFF light switch 90, as described with reference to FIGS. 2 and 3 the downlight 100 may have to employ a driver 124 having a design similar to that depicted in FIG. 7.

The switch 90 may be in wired or wireless communication with the downlight 100. In some embodiments, when the downlight 100 is turned on initially by toggling the switch 90 to its ON position, the downlight 100 will enter its first emission mode 127 e.g., a first correlated color temperature of 2700K or a first lumen level of 700LM. If the downlight 100 is then turned off (by toggling the switch 90 into its off position) and on again (by toggling the switch 90 to its on position) within a specified time window, the downlight 100 can enter the second emission mode 128, e.g., a second correlated color temperature of 3500K or a second lumen level of 900LM. If the downlight 100 is thereafter turned off again (by toggling the switch 90 into its off position) and on again (by toggling the switch 90 to its on position) within a specified time window, the downlight 100 can enter the third emission mode 129, e.g., a third correlated color temperature of 4000K or a third lumen level of 1500LM. If the downlight 100 is thereafter turned off again (by toggling the switch 90 into its off position) and on again (by toggling the switch 90 to its on position) within a specified time window, the downlight 100 will return to the first emission mode 127, e.g., a first correlated color temperature of 2700K or a first lumen level of 700LM.

The duration of each of time window for toggling the switch 90 to change lighting modes may be customized, as desired, and in at least some cases may be about 3 seconds or less. For example, in some embodiments, the duration of the time windows may be about 2.5 seconds or less. In another example, the duration of the time windows may be about 2 seconds or less. In yet another example, the duration of each of the time windows may be about 1.5 seconds or less. In some instances, either (or both) the first and second time windows may be user-programmable.

Figure 7:
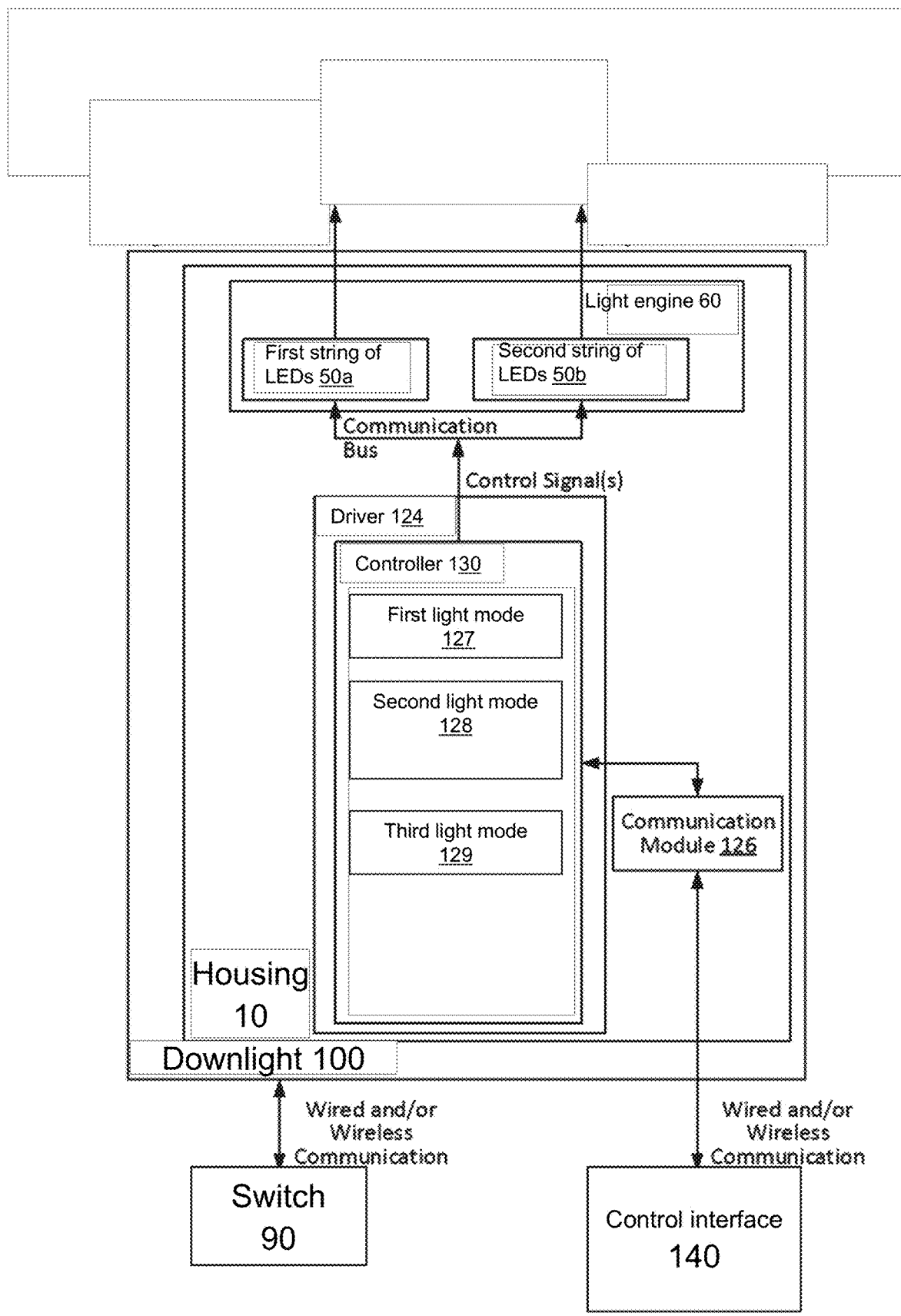
FIG. 7 is a block diagram illustrating a driver for use with the at least one embodiment of the downlights described with reference to FIGS. 1A-6.

Referring to FIG. 7, in some embodiments, the driver 124 may be a single-channel or multi-channel electronic driver configured to drive the solid state light emitters, e.g., LEDs of the first and second strings of LEDs 50a, 50b, utilizing pulse-width modulation (PWM) dimming or any other suitable standard, custom, or proprietary driving techniques. As further shown in FIG. 7, the driver 124 may include a controller 130. In accordance with some embodiments, the driver 124 may be configured to provide a downlight 100 with a three-mode operation; that is, the driver 124 may provide downlight 100 with: (1) a first emission mode 127 e.g., a first correlated color temperature of 2700K or a first lumen level of 700LM; (2) a second emission mode 128, e.g., a second correlated color temperature of 3500K or a second lumen level of 900LM; and (3) a third emission mode 129, e.g., a third correlated color temperature of 4000K or a third lumen level of 1500LM.

In some embodiments, the downlight 100 having the three aforementioned light modes, i.e., first emission mode 127, a second emission mode 128, and third emission mode 129 (having settings set depending upon being practiced in the embodiments illustrated in FIG. 2 or 3) depending upon the application to the driver 124 to the embodiments depicted in FIGS. 2 and 3 may be driven by the driver 124 including a controller 130 configured to support mode changing for the lamp 100 based, in part or in whole, on hysteresis. For example, mode changing of the downlight 100 may be based, in part or in whole, on the hysteresis phenomena of a switch 90, e.g., light switch, in operation toggling between ON and OFF electrical states. In accordance with some embodiments, the output of LEDs for the first and second string of LEDs 50a, 50b, and thus the downlight 100 may be electronically controlled by controller 130. To such ends, the controller 130 may be operatively coupled with the LEDs of the first and second string of LEDs 50a, 50b (or light engine 69 more generally), for instance, by a communication bus or other suitable interconnect. In some embodiments, the controller 130 may be configured to communicate with the LEDs, i.e., solid state light emitters, via any one, or combination, of suitable standard, custom, or proprietary wired or wireless digital communications protocol.

In accordance with some embodiments, the first emission mode 127, the second emission mode 128, and the third emission mode 129 (having settings set depending upon being practiced in the embodiments illustrated in FIG. 2 or 3) of the controller 130 may be implemented in any suitable standard, custom, or proprietary programming language, such as, for example, C, C++, objective C, JavaScript, or any other suitable instruction set, as will be apparent in light of this disclosure. The module(s) of controller 130 can be encoded, for example, on a machine-readable medium that, when executed by a processor, carries out the functionality of downlight 100, in part or in whole. The computer-readable medium may be, for example, a hard drive, a compact disk, a memory stick, a server, or any suitable non-transitory computer or computing device memory that includes executable instructions, or a plurality or combination of such memories. Some embodiments can be implemented, for instance, with gate-level logic, an application-specific integrated circuit (ASIC) or chip set, or other such purpose-built logic. Some embodiments can be implemented with a microcontroller having input/output capability (e.g., inputs for receiving user inputs; outputs for directing other components) and embedded routines for carrying out device functionality. In a more general sense, the functional modules of controller 130 can be implemented in any one, or combination, of hardware, software, and firmware, as desired for a given target application or end-use.

Moreover, in some embodiments, a given module of controller 130 (or controller 130 more generally) may be programmable to achieve any of the various functions and emissions capabilities desired of downlight 100 for a given target application or end-use. The present disclosure is not intended to be limited only to these example lighting control modules and output signals; as additional and/or different lighting control modules and output signals may be provisioned, as desired for a given target application or end-use.

Further, it is not intended to be limited only to drivers 124 including these specific example controllers 130. In a more general sense, and in accordance with some other embodiments, controller 130 can be any power supply controller IC or microcontroller having the ability to sense the operation of the input power (e.g., based on the on/off state of switch 90, discussed below) while maintaining a hysteresis from on-to-off and off-to-on control, with LED string control being provided by controlling the on/off state of the LEDs in the first and second string of LEDs 50a, 50b. In some still other cases, controller 130 may be a microcontroller programmed to receive a control input from a wired or wireless source other than, or in addition to, a switch (e.g., such as switch 90) and accordingly generate a target mode of lighting, e.g. the first emission mode 127, the second emission mode 128, and the third emission mode 129 (having settings set depending upon being practiced in the embodiments illustrated in FIG. 2 or 3), by controlling the duty cycle of the first and second string of LEDs 50a, 50b.

Returning to FIG. 7, the downlight 100 optionally may include a communication module 126, which may be configured as a transmitter, a receiver, or both (i.e., a transceiver). In some cases, communication module 126 may be separate and distinct from controller 130 (e.g., as generally shown in FIG. 7), though in some other cases, communication module 126 may be a component of or otherwise integrated with controller 130. In accordance with some embodiments, controller 130 may be configured to output control signal(s) to the first and second strings of LEDs 50a, 50b based, at least in part, on input received from a remote source, such as a control interface 140. Control interface 140 may be physical, virtual, or a combination thereof and may be configured to communicate with the controller 130 (via intervening communication module 126), which in turn interprets input received from control interface 140 distributes desired control signal(s) to the first and second strings of LEDs 50a, 50b of the light engine 60.

In some embodiments, the control interface 140 may be employed, in accordance with some embodiments, in changing the emissions modes of downlight 100. In some embodiments, the control interface 140 interacts with the switch 90, e.g., over the communications module 126, as the switch toggles from the ON and Off electrical states, and provides the signal to the driver 124. The driver 124 receiving the signal from the control interface employing the controller 130 sends a signal to illuminate either the string of LEDs 50a, 50b to provide the first emission mode 127, the second emission mode 128, or the third emission mode 129 (having settings set depending upon being practiced in the embodiments illustrated in FIG. 2 or 3).

To such ends, the communication module 126 and control interface 140 may be configured for wired or wireless communication (or both) utilizing any one, or combination, of suitable means, such as Universal Serial Bus (USB), Ethernet, FireWire, Wi-Fi, Bluetooth, or ZigBee, among others. Optionally, the control interface 140 may be or otherwise employ a touch-sensitive display or surface, such as a touchpad or other device with a touch-based user interface (UI) or graphical UI (GUI), as provided by a computing device, mobile or otherwise. Other suitable configurations for the communication module 126 and the control interface 65 will depend on a given application.

In another aspect, a lighting method is provided. The lighting method includes housing a light source, e.g., light engine 60, including at least one string of light emitting diodes 50 in a body of a lamp having a downlight geometry. The method also includes providing device circuitry, as depicted in FIGS. 6 and 7, that allows for adjustments to lumen settings and correlated color temperature settings through an interface of setting switches fixed to the body of the lamp. The method also includes providing a receiver for receiving from a remote switch 90, 95 adjustments to dimming and intensity settings for light emitted by the lamp. Before installing the downlight 100, based on the application space, the lighting designer may determine the desired light output and the light color needs. Using the light level switch 15a, and the light color level switch 15b on the back of the unit, as depicted in FIGS. 1A and 1B, the installer selects appropriate levels for the light output and the light color levels for the downlight 100. The user may then install the downlight 100. As needed by the application space, the light levels and/or the light color levels can be changed by uninstalling the unit and adjusting the switches to the desired settings.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs.

Having described preferred embodiments of a downlight having selectable lumens settings and selectable correlated color temperature (CCT), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims:

What is claimed is:
1. A lamp comprising:
  a housing including a base portion end that contains driver electronics and a light emission end, wherein a light engine is positioned to emit light through the light emission end of the housing;
  at least one first switch for selecting at least one lumen setting for the light emitted by the light engine; and
  at least one second switch for selecting at least one correlated color temperature, wherein the first and second switch are positioned on the housing, wherein the at least one first switch and the at least one second switch are mounted on an exterior face of a sidewalls surface of the housing between a back surface of the base portion end and the light emission end of the housing.
2. The lamp of claim 1, further comprising an electronics package for the light engine enclosed within the housing, wherein power wiring to the electronics package extends directly through the sidewall of the housing.
3. A lamp comprising:
  a housing including a base portion end that contains driver electronics and a light emission end, wherein a light engine is positioned to emit light through the light emission end of the housing;
  at least one first switch for selecting at least one lumen setting for the light emitted by the light engine; and
  at least one second switch for selecting at least one correlated color temperature, wherein the first and second switch are positioned on the housing, wherein the at least one first switch and the at least one second switch are mounted on an exterior face of a sidewalls surface of the housing between a back surface of the base portion end and the light emission end of the housing, wherein the housing has a geometry of a downlight, and said at least one first switch and said at least one second switch are positioned on a portion of said sidewall that is positioned within a ceiling when the lamp is in an installed position.
4. The lamp recited in claim 1 further comprising a dimming circuit for dimming the light emitted by the lamp in response to signal from a 0-10V dimming switch.
5. The lamp recited in claim 1, wherein the light emitting diodes are surface mount device (SMD) light emitting diodes (LED).

6. The lamp as recited in claim 1, wherein the light engine includes at least one light emitting diode.

7. The lamp as recited in claim 6, wherein the at least one light emitting diode is chip on board (COB) light emitting diodes.

8. The lamp as recited claim 1, wherein the first switch has three selectable settings of 700 LM, 900 LM and 1500 LM.

9. The lamp as recited in claim 1, wherein the second switch has three selectable settings of 2700K, 3500K and 4000K.

10. A lamp comprising:
a housing including a base portion end that contains driver electronics and a light emission end, wherein a light engine is positioned to emit light through the light emission end of the housing;
a switch positioned on the housing for selecting a first setting for the light emitted by the light engine, wherein the switch is mounted on an exterior face of a sidewalls surface of the housing between a back surface of the base portion end and the light emission end of the housing, wherein the housing has a geometry of a downlight, and said at least one first switch and said at least one second switch are positioned on said exterior face of said sidewall on a portion of said sidewall that is positioned within a ceiling when the lamp is in an installed position; and
a receiver for receiving signal from a remote ON/OFF switch, wherein the signal from the remote ON/OFF switch selects a second setting for light emitted by the light engine.

11. The lamp of claim 10, wherein the first and second settings are selected from the group consisting of lumen level, color correlated temperature or a combination thereof.

12. The lamp recited in claim 10 further comprising a dimming circuit for dimming the light emitted by the lamp in response to signal from a 0-10V dimming switch.

13. The lamp recited in claim 10, wherein the light engine includes light emitting diodes (LEDs).

14. The lamp recited in claim 10, wherein the light emitting diodes (LEDs) are surface mount device (SMD) light emitting diodes (LED).

15. The lamp as recited in claim 10, wherein the light emitting diodes are chip on board (COB) light emitting diodes.

16. The lamp as recited claim 10, wherein the switch positioned on the housing has three selectable settings of 700 LM, 900 LM and 1500 LM.

17. The lamp as recited in claim 10, wherein the switch positioned on the housing has three selectable settings of 2700K, 3500K and 4000K.

18. The lamp as recited in claim 10, wherein receiver for receiving signal from the remote ON/OFF switch receives said signal for one of three selectable settings of 700 LM, 900 LM and 1500 LM.

19. The lamp as recited in claim 10, wherein receiver for receiving signal from the remote ON/OFF switch receives said signal for one of three selectable settings of 2700K, 3500K and 4000K.

20. A lighting method comprising:
housing a light source including light emitting diodes in a body of a lamp including a base portion end that contains driver electronics and a light emission end, wherein the light source is positioned to emit light through the light emission end of the body; and
providing device circuitry that allows for adjustments to lumen settings and correlated color temperature settings for light emitted by the light source through an interface of setting switches fixed to the body of the lamp, wherein the setting switches are mounted on an exterior face of a sidewall surface of the body between a back surface of the base portion end and the light emission end of the body.

* * * * *